United States Patent
Fukasawa et al.

(10) Patent No.: US 10,091,129 B2
(45) Date of Patent: Oct. 2, 2018

(54) INFORMATION PROCESSING APPARATUS AND METHOD, INFORMATION PROCESSING SYSTEM, AND NON-TRANSITORY COMPUTER READABLE MEDIUM

(71) Applicant: FUJI XEROX CO., LTD., Minako-ku, Tokyo (JP)

(72) Inventors: Tetsuo Fukasawa, Kanagawa (JP); Kohshiro Inomata, Kanagawa (JP)

(73) Assignee: FUJI XEROX CO., LTD, Minato-ku, Tokyo (JP)

( * ) Notice: Subject to any disclaimer, the term of this patent is extended or adjusted under 35 U.S.C. 154(b) by 541 days.

(21) Appl. No.: 14/288,550

(22) Filed: May 28, 2014

(65) Prior Publication Data
US 2015/0120935 A1 Apr. 30, 2015

(30) Foreign Application Priority Data
Oct. 30, 2013 (JP) .................................. 2013-225624

(51) Int. Cl.
*H04L 12/911* (2013.01)
*H04L 29/08* (2006.01)
(Continued)

(52) U.S. Cl.
CPC .......... *H04L 47/74* (2013.01); *G06F 9/45558* (2013.01); *G06F 9/5011* (2013.01);
(Continued)

(58) Field of Classification Search
CPC . H04L 63/0272; H04L 67/10; H04L 67/1002; H04L 41/5029; H04L 47/70;
(Continued)

(56) References Cited

U.S. PATENT DOCUMENTS 8,447,829 B1 * 5/2013 Geller .................... G06F 9/468
709/217
9,306,870 B1 * 4/2016 Klein ................ H04L 29/06176
(Continued)

FOREIGN PATENT DOCUMENTS

JP  2000242460 A   9/2000
JP  2000-335053 A  12/2000
(Continued)

OTHER PUBLICATIONS

Communication dated May 23, 2017, from the Japanese Patent Office in counterpart Japanese application No. 2013-225624.

*Primary Examiner* — Sargon N Nano
(74) *Attorney, Agent, or Firm* — Sughrue Mion, PLLC

(57) ABSTRACT

An information processing apparatus includes a communication section, a calculator, and a sender. The communication section communicates with a processing providing apparatus which utilizes a different amount of resource in accordance with a load of processing to be performed on data. The calculator calculates an amount of resource to be utilized for performing processing on the data by the processing providing apparatus, at plural time points corresponding to different steps of processing performed by the information processing apparatus before sending the data to the processing providing apparatus. The sender sends a request to get or release the resource based on the amount of resource calculated by the calculator to the processing providing apparatus via the communication section.

19 Claims, 8 Drawing Sheets

(51) Int. Cl.
*G06F 9/50* (2006.01)
*G06F 9/455* (2018.01)
*H04L 12/24* (2006.01)

(52) U.S. Cl.
CPC ........ *H04L 47/823* (2013.01); *H04L 67/1097* (2013.01); *H04L 67/325* (2013.01); *G06F 2009/45562* (2013.01); *G06F 2009/45575* (2013.01); *H04L 41/5096* (2013.01)

(58) Field of Classification Search
CPC ....... H04L 47/25; H04L 47/72; H04L 47/822; H04L 47/828; H04L 47/74; H04L 47/76; H04L 47/78; G06F 9/5005; G06F 9/505; G06F 11/3409; G06F 11/3442; G06F 9/5016; G06F 9/5027
See application file for complete search history.

(56) References Cited

U.S. PATENT DOCUMENTS

| | | | |
|---|---|---|---|
| 9,442,769 B2* | 9/2016 | Ferris | G06F 9/505 |
| 9,477,997 B2* | 10/2016 | Ben-Natan | G06F 9/5027 |
| 2002/0129123 A1* | 9/2002 | Johnson | H04L 65/4084 709/219 |
| 2003/0046396 A1* | 3/2003 | Richter | G06F 9/505 709/226 |
| 2003/0208641 A1* | 11/2003 | Wesemann | G06F 9/505 719/332 |
| 2007/0180087 A1 | 8/2007 | Mizote et al. | |
| 2009/0083516 A1* | 3/2009 | Saleem | G06F 9/505 712/28 |
| 2009/0271478 A1* | 10/2009 | Imai | G06F 9/505 709/203 |
| 2011/0302315 A1* | 12/2011 | Galvin | H04L 63/0823 709/228 |
| 2011/0320606 A1* | 12/2011 | Madduri | G06F 9/5005 709/226 |
| 2012/0131176 A1* | 5/2012 | Ferris | G06F 9/5072 709/224 |
| 2012/0191858 A1* | 7/2012 | Madduri | G06F 9/5005 709/226 |
| 2012/0221454 A1* | 8/2012 | Morgan | G06F 9/5027 705/37 |
| 2012/0297395 A1* | 11/2012 | Marchand | G06F 9/5027 718/104 |
| 2013/0120651 A1* | 5/2013 | Perry | H04N 21/2343 348/441 |
| 2013/0205028 A1* | 8/2013 | Crockett | G06F 9/5027 709/226 |
| 2014/0006465 A1* | 1/2014 | Davis | G06F 17/30194 707/827 |
| 2014/0007239 A1* | 1/2014 | Sharpe | G06F 21/561 726/24 |
| 2014/0016650 A1* | 1/2014 | Chai | H04L 45/02 370/431 |
| 2014/0156835 A1* | 6/2014 | Atchison | G06F 9/5072 709/224 |
| 2014/0247792 A1* | 9/2014 | Wang | H04W 28/16 370/329 |
| 2014/0258609 A1* | 9/2014 | Cui | G06F 3/061 711/113 |
| 2015/0263987 A1* | 9/2015 | Klein | H04L 29/08 709/226 |

FOREIGN PATENT DOCUMENTS

| | | |
|---|---|---|
| JP | 2007-164304 A | 6/2007 |
| JP | 2010-028195 A | 2/2010 |
| JP | 2013075365 A | 4/2013 |
| WO | 2010109952 A1 | 9/2010 |

* cited by examiner

FIG. 6

| CLOUD SERVICE | SENDING DESTINATION |
|---|---|
| SERVICE A | http://aaa/tenantA/resource |
| SERVICE B | http://bbb/tenantB/resource |
| SERVICE C | http://ccc/tenantC/resource |

FIG. 7

```
<data>
  <record>
    <record name="getRequest">
      <string name="deviceid">aaaaaa</string>
      <string name="status">ServiceBoot</string>
      <string name="value">1</string>
    </record>
  </record>
</data>
```

FIG. 8A

| CLOUD SERVICE | COLOR | RESOLUTION | DOCUMENT SIZE |
|---|---|---|---|
| SERVICE A | C1 | R1 | S1 |
| SERVICE B |  | R2 | S2 |
| SERVICE C | C2 |  | S3 |

FIG. 8B

| COLOR | NUMBER OF VIRTUAL MACHINES/COLOR |
|---|---|
| C1 | 0.2/BLACK AND WHITE, 1.0/COLOR |
| C2 | 0.2/BLACK AND WHITE, 0.4/COLOR |

FIG. 8C

| RESOLUTION | NUMBER OF VIRTUAL MACHINES/RESOLUTION |
|---|---|
| R1 | 0.5/100 dpi |
| R2 | 0.2/100 dpi |

FIG. 8D

| DOCUMENT SIZE | NUMBER OF VIRTUAL MACHINES/DOCUMENT SIZE |
|---|---|
| S1 | 0.2/A4, 0.4/A3 |
| S2 | 0.2/A4, 0.2/A3 |
| S3 | 0.3/A4, 0.6/A3 |

FIG. 9

| CLOUD SERVICE | AVAILABILITY OF ESTIMATION EXPRESSION | ESTIMATION EXPRESSION |
|---|---|---|
| SERVICE A | AVAILABLE | AMOUNT OF IMAGE DATA OF DOCUMENTS WHICH HAVE NOT BEEN MODIFIED × 2 |
| SERVICE B | AVAILABLE | AMOUNT OF IMAGE DATA OF THE FIRST DOCUMENT × NUMBER OF DOCUMENTS PLACED ON DOCUMENT TRAY |
| SERVICE C | NOT AVAILABLE | |

FIG. 10

```
<data>
  <record>
    <record name="releaseRequest">
      <string name="deviceid">aaaaaa</string>
      <string name="status">ParameterSet</string>
      <string name="value">1</string>
    </record>
  </record>
</data>
```

```
$ nova list
+--------------------------------------+----------+--------+------------------------+
|                  ID                  |   Name   | Status |        Networks        |
+--------------------------------------+----------+--------+------------------------+
|266ec61b-79c7-41cb-ac74-5bed831c5c28  | tiny_001 | ACTIVE |nova_network1=10.0.0.2  |
+--------------------------------------+----------+--------+------------------------+
|223ec6db-fdaf-fdaa-ggrg-fdjkaaf67d8a  | tiny_002 | ACTIVE |nova_network1=10.0.0.3  |
+--------------------------------------+----------+--------+------------------------+
```

```
<data>
    <record>
            <string name="Api_Result">eFull</string>
    </record>
</data>
```

| CLOUD SERVICE | NUMBER OF VIRTUAL MACHINES/ TOTAL AMOUNT OF IMAGE DATA |
|---|---|
| SERVICE A | 0.5/1 MB |
| SERVICE B | 1/1 MB |

#  US 10,091,129 B2

INFORMATION PROCESSING APPARATUS AND METHOD, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-225624 filed Oct. 30, 2013.

BACKGROUND (i) Technical Field

The present invention relates to an information processing apparatus and method, an information processing system, and a non-transitory computer readable medium.

(ii) Related Art

Cloud services provided to a user as a result of a server device performing various information processing operations, such as storing of data and converting of a data format, on behalf of a client device are known.

SUMMARY

According to an aspect of the invention, there is provided an information processing apparatus including a communication section, a calculator, and a sender. The communication section communicates with a processing providing apparatus which utilizes a different amount of resource in accordance with a load of processing to be performed on data. The calculator calculates an amount of resource to be utilized for performing processing on the data by the processing providing apparatus, at plural time points corresponding to different steps of processing performed by the information processing apparatus before sending the data to the processing providing apparatus. The sender sends a request to get or release the resource based on the amount of resource calculated by the calculator to the processing providing apparatus via the communication section.

BRIEF DESCRIPTION OF THE DRAWINGS

An exemplary embodiment of the present invention will be described in detail based on the following figures, wherein:

FIG. 6 illustrates an example of URL data;

FIG. 7 illustrates an example of a get request;

FIGS. 8A through 8D illustrate examples of number-of-machines calculating data Dp;

FIG. 9 illustrates an example of estimation expression data;

FIG. 10 illustrates an example of a release request;

DETAILED DESCRIPTION

Figure 1:
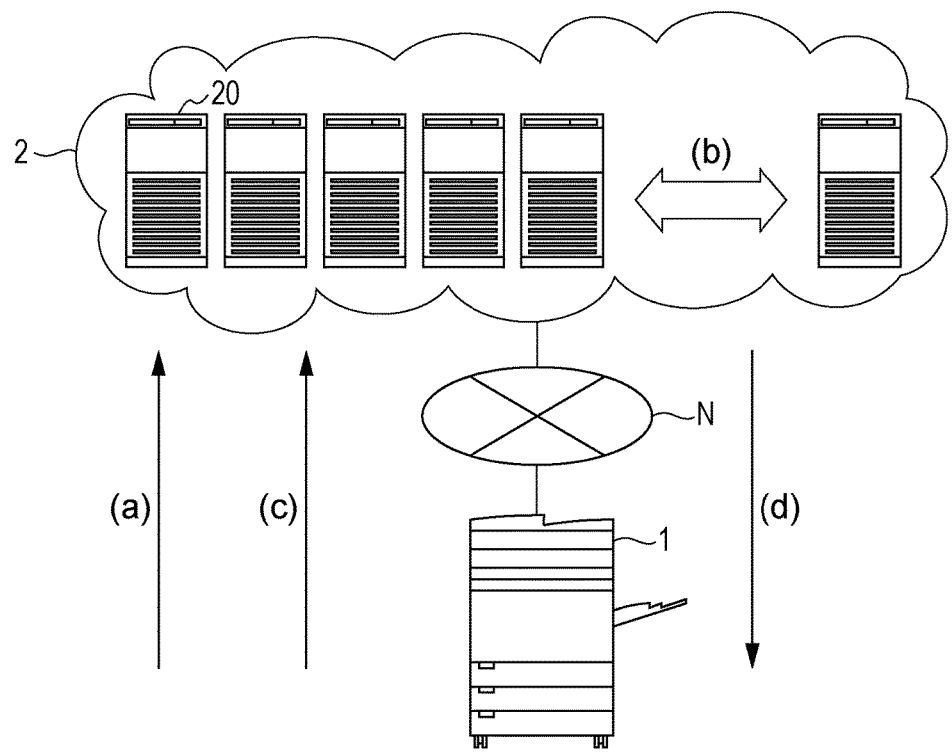
FIG. 1 illustrates an example of the overall configuration of an image processing system.

FIG. 1 illustrates an example of the overall configuration of an image processing system (an example of an information processing system) according to an exemplary embodiment of the invention. The image processing system is a system that performs various data processing operations concerning image data (for example, detecting a difference between items of image data, analyzing information on the basis of image data, and converting the format of image data). The image processing system includes an image forming apparatus 1 (an example of an information processing apparatus) and a service providing apparatus 2. The image forming apparatus 1 serves as a copying machine, a printer, a scanner, and a fax machine. The service providing apparatus 2 is a server device which provides services. In an exemplary embodiment of the invention, a service is provided by combining at least one function. The service providing apparatus 2 provides cloud services as an example of services. The cloud services are services that provide computer resources for performing various information processing operations, such as storing data and converting data formats, via a communication network. The service providing apparatus 2 performs various data processing operations concerning image data on behalf of the image forming apparatus 1. The service providing apparatus 2 utilizes a different amount/number of computer resources, depending on the load of data processing performed in a cloud service. The computer resources are physical or virtual computer resources used for providing cloud services by the service providing apparatus 2, and are, for example, virtual machines provided within the service providing apparatus 2 by utilizing a virtualization technology. In FIG. 1, plural virtual machines 20 are disposed within the service providing apparatus 2 in a virtual manner. The service providing apparatus 2 utilizes a different number of virtual machines 20 depending on the load of processing performed in a cloud service.

The image forming apparatus 1 and the service providing apparatus 2 are connected to each other via a communication network N, such as the Internet. In the image processing system, the image forming apparatus 1 sends a request to get or release a virtual machine 20 to the service providing apparatus 2 (see (a) of FIG. 1). A request to get or release a virtual machine 20 refers to a request to cause the service providing apparatus 2 to get or release a virtual machine 20. The service providing apparatus 2 gets or releases a virtual machine 20 in response to a request received from the image forming apparatus 1 (see (b) of FIG. 1). After a virtual machine 20 has been got or released, the image forming apparatus 1 sends image data to the service providing apparatus 2 (see (c) of FIG. 1). The image forming apparatus 1 sends image data, for example, obtained by optically reading documents, to the service providing apparatus 2. The service providing apparatus 2 returns image data subjected to information processing by using a cloud service to the image forming apparatus 1 (see (d) of FIG. 1).

In FIG. 1, if a virtual machine 20 is got, a user who has sent a request to get a virtual machine 20 is billed for the cost per machine or per machine and time. As more virtual machines 20 are got, and also, in some cases, as the time for which a virtual machine 20 is got becomes longer, the cost incurred for a user increases.

Upon receiving a request to get a virtual machine 20 from the image forming apparatus 1, the service providing apparatus 2 starts to get the same number of virtual machines 20 as the number specified in this request. Getting of virtual machines 20 takes a time. For example, if the service providing apparatus 2 starts to get virtual machines 20 in an environment in which not even one virtual machine 20 has been got, an initializing processing time is required before getting virtual machines 20 regardless of the number of virtual machines 20 to be got. It is now assumed that such an initializing processing time is $x1$ (seconds), the time required to get one virtual machine 20 is $t1$ (seconds per machine), and the number of virtual machines 20 to be got is $p$. In this case, the total time required to get virtual machines 20 is expressed by $x1+t1 \times p$ (seconds).

If the service providing apparatus 2 adds a new virtual machine 20 to virtual machines 20 which have already been got, an initializing processing time is required before getting a new virtual machine 20. If such an initializing processing time is $x2$ (seconds) and the number of virtual machines 20 to be added is $q$, the total time required to add virtual machines 20 is expressed by $x2+t1 \times q$ (seconds).

If the service providing apparatus 2 releases a virtual machine 20 that has already been got, an initializing processing time is required before releasing a virtual machine 20 that has already been got. If such an initializing processing time is $x3$ (seconds), the time required to release one virtual machine 20 is $t2$ (seconds per machine), and the number of virtual machines 20 to be released is $r$, the total time required to release virtual machines 20 is expressed by $x3+t2 \times r$ (seconds).

The amount of processing required for adding a new virtual machine 20 to virtual machines 20 that have already been got is usually smaller than that for getting a virtual machine 20 from the state in which no virtual machine 20 has been got, and the amount of processing for releasing a virtual machine 20 that has already been got is usually smaller than that for adding a new virtual machine 20. That is, the relationships among the amounts of processing required for getting or releasing virtual machines 20 are usually expressed by $x1>x2>x3$.

Additionally, the amount of processing required for releasing one virtual machine 20 is usually smaller than that for getting one virtual machine 20. That is, the relationship between the amounts of processing for getting or releasing one virtual machine 20 is usually expressed by $t1>t2$.

Figure 2:
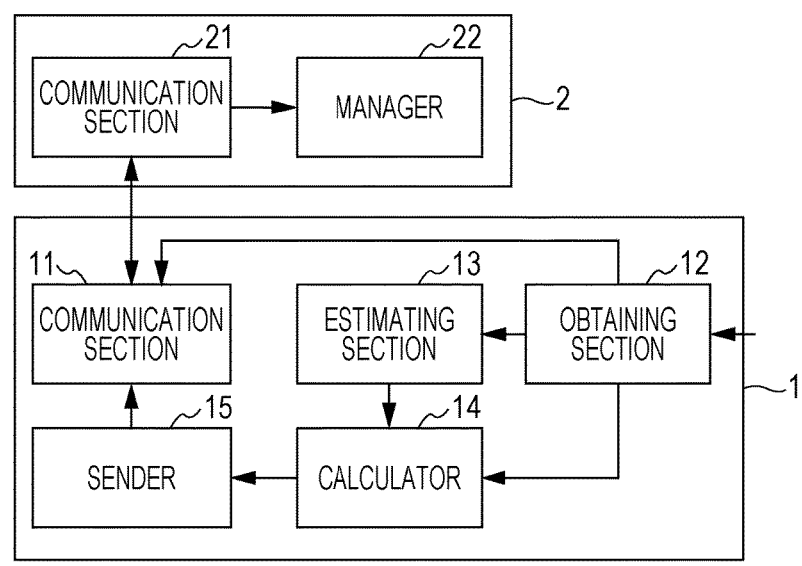
FIG. 2 is a block diagram illustrating an example of the functional configuration of the image processing system.

FIG. 2 is a block diagram illustrating an example of the functional configuration of the image processing system. The image forming apparatus 1 includes a communication section 11, an obtaining section 12, an estimating section 13, a calculator 14, and a sender 15. The communication section 11 communicates with the service providing apparatus 2. The obtaining section 12 obtains image data to be subjected to information processing in a cloud service. The estimating section 13 estimates the amount of image data before the obtaining section 12 finishes obtaining image data. The calculator 14 calculates the number of virtual machines 20 to be utilized for processing image data by the service providing apparatus 2. The calculator 14 calculates the number of virtual machines 20 at plural time points corresponding to different steps of processing performed by the image forming apparatus 1 before sending image data to the service providing apparatus 2. If the amount of image data is estimated by the estimating section 13, the calculator 14 calculates the number of virtual machines 20 in accordance with the estimated amount of image data. If the amount of image data is not estimated by the estimating section 13, every time the amount of image data obtained by the obtaining section 12 exceeds a predetermined value, the calculator 14 calculates the number of virtual machines 20 in accordance with this predetermined value. The sender 15 sends, via the communication section 11, a request to get or release the same number of virtual machines 20 as the number calculated by the calculator 14 to the service providing apparatus 2. The communication section 11 sends image data obtained by the obtaining section 12 to the service providing apparatus 2 after a request to get or release virtual machines 20 has been sent.

The service providing apparatus 2 includes a communication section 21 and a manager 22. The communication section 21 communicates with the image forming apparatus 1. The manager 22 manages the number of virtual machines 20 to be utilized for performing information processing in a cloud service. The manager 22 gets or releases virtual machines 20 before starting to perform processing in a cloud service.

Figure 3:
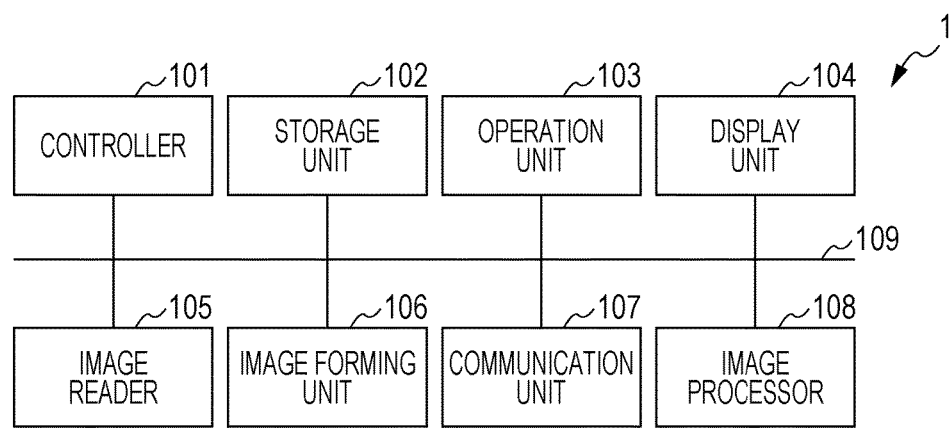
FIG. 3 is a block diagram illustrating an example of the hardware configuration of an image forming apparatus.

FIG. 3 is a block diagram illustrating an example of the hardware configuration of the image forming apparatus 1. The image forming apparatus 1 includes, as shown in FIG. 3, a controller 101, a storage unit 102, an operation unit 103, a display unit 104, an image reader 105, an image forming unit 106, a communication unit 107, and an image processor 108. The individual elements of the image forming apparatus 1 are connected to a bus 109, and send and receive data therebetween via the bus 109.

The controller 101 is a unit for controlling operations performed by the individual elements of the image forming apparatus 1. The controller 101 includes an arithmetic processing unit, such as a central processing unit (CPU), and recording media (main storage devices), such as a read only memory (ROM) and a random access memory (RAM). The CPU reads a control program stored in the ROM and executes it by using the RAM as a work area. The controller 101 executes the control program so as to implement operations, such as forming an image on a sheet, reading a document and generating image data indicating the document, and communicating with another device via the communication network N.

The storage unit 102 is a device for storing data therein. The storage unit 102 includes recording media (auxiliary storage devices), such as a hard disk and a flash memory, and stores therein data received by the communication unit 107 and data generated by the image forming apparatus 1. The storage unit 102 may also include attachable/detachable recording media (removable media), such as a memory card and a universal serial bus (USB) memory, and a device for reading and writing data from and into such recording media.

The operation unit 103 is a unit for receiving an operation performed by a user. The operation unit 103 includes operators (such as buttons and keys), and supplies a control signal corresponding to a pressed operator to the controller 101. The operation unit 103 may be constituted by a touch panel which includes the display unit 104 and a sensor provided on the display surface of the display unit 104 and which supplies a control signal corresponding to a touched position to the controller 101.

The display unit 104 is a unit for displaying information. The display unit 104 includes, for example, a liquid crystal display as a display device. The display unit 104 displays, under the control of the controller 101, a menu screen for operating the image forming apparatus 1 and data concerning the image forming apparatus 1.

The image reader 105 is a unit for reading a document and converting read information into image data. The image reader 105 includes an image reading device which optically reads a document and generates image data indicating an image formed on the document. The image reader 105 supplies the generated image data to the image processor 108. In this exemplary embodiment, the image reader 105 sequentially reads images from plural documents placed on a document tray which forms an automatic document feeding mechanism (not shown) of the image forming apparatus 1.

The image forming unit 106 is a unit for forming images. The image forming unit 106 includes an image forming mechanism for forming toner images on a recording medium, such as paper, by using an electrophotographic system. The image forming mechanism does not have to utilize an electrophotographic system, but may utilize another recording method, such as an inkjet method.

The communication unit 107 is a unit for sending and receiving data. The communication unit 107 is connected to the communication network N and serves as a communication interface which communicates with another device connected to the communication network N.

The image processor 108 is a unit for performing image processing on image data. In this case, the image processing refers to color correction or tone correction. The image processor 108 supplies image data subjected to image processing to the image forming unit 106.

In FIG. 3, the controller 101 which is executing a program is an example of each of the estimating section 13, the calculator 14, and the sender 15. The image reader 105 controlled by the controller 101 which is executing a program is an example of the obtaining section 12. The communication unit 107 controlled by the controller 101 which is executing a program is an example of the communication section 11.

Figure 4:
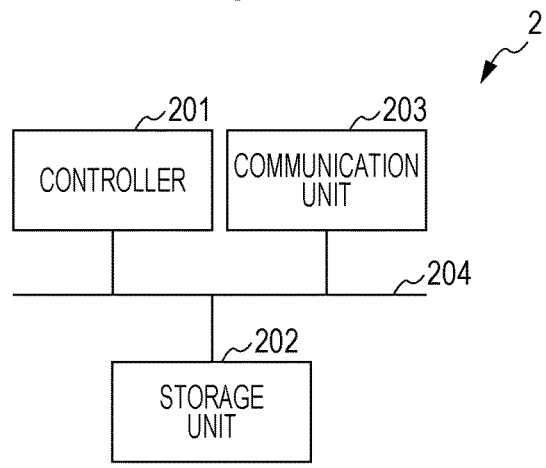
FIG. 4 is a block diagram illustrating an example of the hardware configuration of a service providing apparatus.

FIG. 4 is a block diagram illustrating an example of the hardware configuration of the service providing apparatus 2. The service providing apparatus 2 is a computer including, as shown in FIG. 4, a controller 201, a storage unit 202, and a communication unit 203. The individual elements of the service providing apparatus 2 are connected to a bus 204, and send and receive data therebetween via the bus 204.

The controller 201 is a unit for controlling operations performed by the individual elements of the service providing apparatus 2. The controller 201 includes an arithmetic processing unit, such as a CPU, and recording media (main storage devices), such as a ROM and a RAM. The storage unit 202 is a device for storing data therein. The storage unit 202 includes recording media (auxiliary storage devices), such as a hard disk and a flash memory, and stores therein data received by the communication unit 203. The communication unit 203 is a unit for sending and receiving data. The communication unit 203 is connected to the communication network N and serves as a communication interface which communicates with another device connected to the communication network N. The service providing apparatus 2 does not necessarily have to be physically a single computer, and may be constituted by plural computers. In FIG. 4, the controller 201 which is executing a program is an example of the manager 22. The communication unit 203 controlled by the controller 201 which is executing a program is an example of the communication section 21.

Figure 5A:
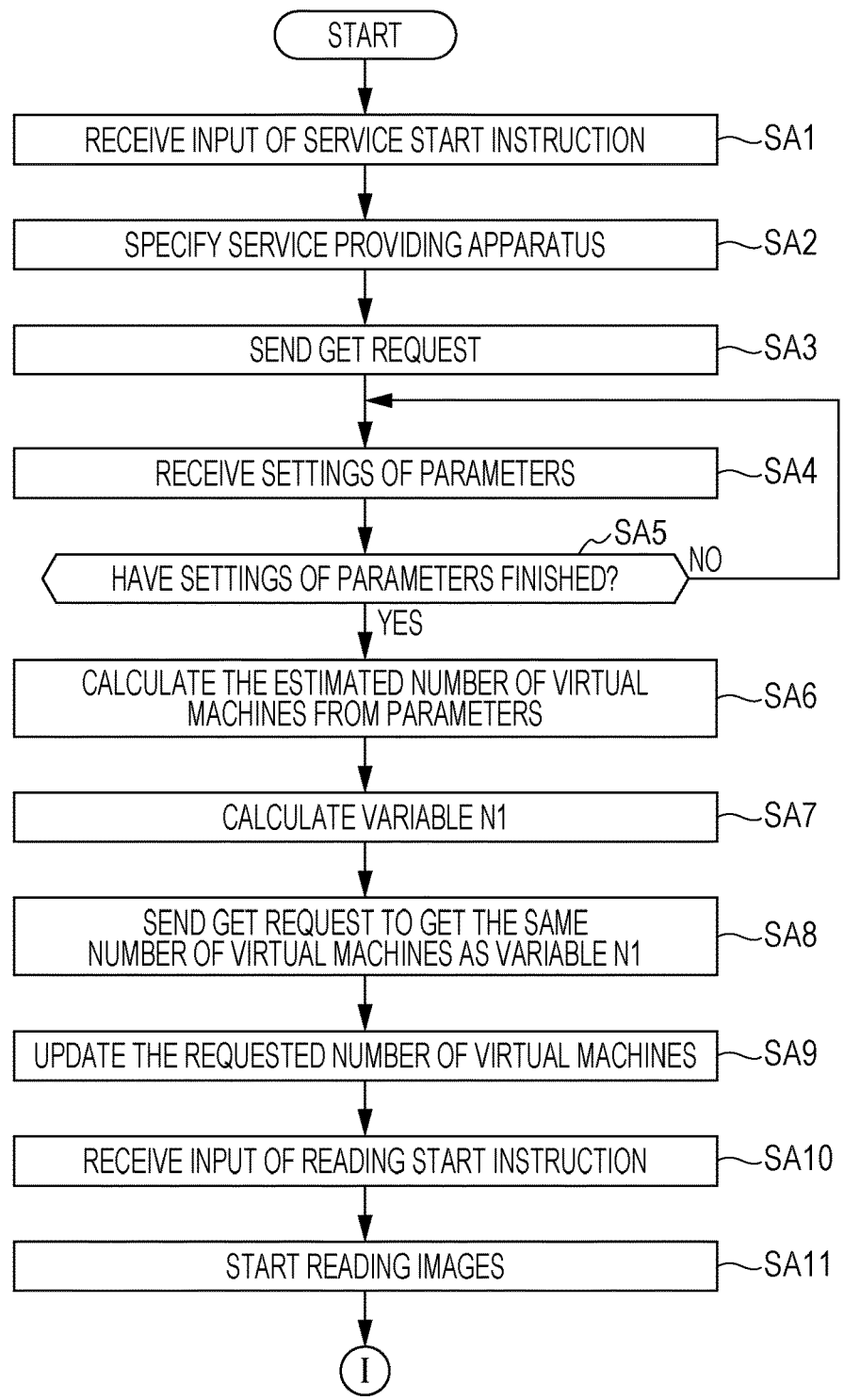
FIGS. 5A and 5B show a flowchart illustrating processing performed by the image forming apparatus.
Figure 5B:
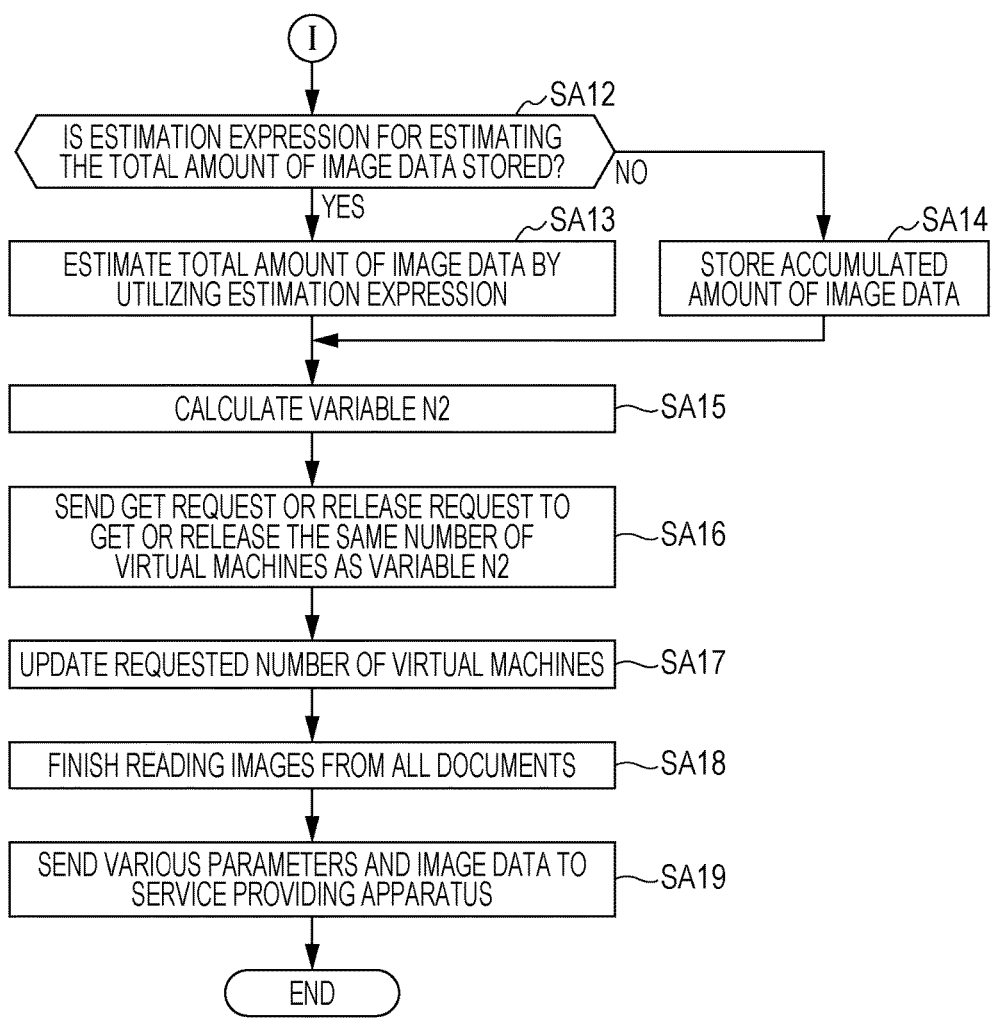

FIGS. 5A and 5B show a flowchart illustrating processing performed by the image forming apparatus 1. In step SA1, the controller 101 receives the input of an instruction to start to use a cloud service (hereinafter referred to as a "service start instruction"). A service start instruction is input as a result of a user operating the operation unit 103. In the display unit 104, available plural cloud services are displayed, and the user selects one of the cloud services. In step SA2, the controller 101 specifies a service providing apparatus 2 that provides the cloud service specified by the user. More specifically, on the basis of data indicating the association between the types of cloud services and uniform resource locators (URLs) of the service providing apparatuses 2 (hereinafter such data will be referred to as "URL data") stored in the storage unit 102, the controller 101 specifies a URL of the service providing apparatus 2 that provides the cloud service specified by the user. The controller 101 stores the URL of the specified service providing apparatus 2 in the RAM.

FIG. 6 illustrates an example of the URL data. The URL data has a "cloud service" field and a "sending destination" field. The cloud service field indicates the types of cloud services. In the URL data shown in FIG. 6, cloud services A, B, and C are indicated as the types of cloud services. The cloud services A, B, and C are provided by different service providing apparatuses 2. The sending destination field indicates the URL of each of the service providing apparatuses 2. The URLs of the service providing apparatuses 2 that provide the cloud services A, B, and C are "http://aaa/tenantA/resource", "http://bbb/tenantB/resource", and "http://ccc/tenantC/resource", respectively.

Referring back to FIG. 5A, in step SA3, the controller 101 sends a request to get a virtual machine 20 (hereinafter referred to as a "get request") to the service providing apparatus 2. The sending destination of the get request is indicated by the URL of the service providing apparatus 2 stored in the RAM. The get request includes information indicating the number of virtual machines 20 that the user would like the service providing apparatus 2 to get. Since step SA3 is a step in which the user has selected the service, a get request to get a minimal number of virtual machines 20 (for example, one virtual machine 20) is sent to the service providing apparatus 2. The controller 101 sends the get request according to protocols to which cloud services conform (for example, HTTP REST API or SOAP (Simple Object Access Protocol). The controller 101 also stores the number of virtual machines 20 requested to be got (hereinafter referred to as a "requested number of virtual machines 20") in the RAM.

FIG. 7 illustrates an example of a get request. The get request shown in FIG. 7 is a get request which is written in the XML (Extensible Markup Language) format and which is sent according to HTTP REST API. The get request includes, as shown in FIG. 7, information indicating that this request is a request to get a virtual machine 20 (<record name="getRequest"> in the third line) and indicating the number of virtual machines 20 to be got (<string name="value">1</string> in the sixth line). In the example of the get request shown in FIG. 7, the getting of one virtual machine 20 is requested.

Referring back to FIG. 5A, in step SA4, the controller 101 receives settings of various parameters concerning an image reading operation, such as whether to perform color scanning, the resolution of images, and the size of a document. Settings of parameters may be conducted as a result of the user operating the operation unit 103. The controller 101 stores the parameters in the RAM. In step SA5, the controller 101 determines whether or not the user has finished settings of parameters. More specifically, the controller 101 determines whether or not the user has operated the operation unit 103 to input an instruction to finish settings of the parameters. If it is determined that the user has finished settings of the parameters, the controller 101 proceeds to step SA6. If it is determined that the user has not yet finished settings of the parameters, the controller 101 returns to step SA4.

In step SA6, the controller 101 calculates, from the parameters set in step SA4, the number of virtual machines 20 that may be utilized in the service providing apparatus 2 (hereinafter such a number will be referred to as an "estimated number of virtual machines 20"). More specifically, the controller 101 calculates an estimated number of virtual machines 20 on the basis of data, which is stored in the storage unit 102, for calculating an estimated number of virtual machines 20 according to the parameters (hereinafter such data will be referred to as "number-of-machines calculating data Dp"). The controller 101 stores the estimated number of virtual machines 20 in the RAM.

FIGS. 8A through 8D illustrate examples of the number-of-machines calculating data Dp. FIG. 8A illustrates parameters used for each of cloud services. In the example shown in FIG. 8A, parameters used for each of the cloud services A, B, and C are indicated. In FIG. 8A, "color", "resolution", and "document size" represent the number of colors used for reading images, the resolution of images, and the size of a document, respectively. In FIG. 8A, parameters to be used differ depending on the service. It is noted that not all of "color", "resolution", and "document size" parameters have to be used for a service. For example, for a cloud service for analyzing and summarizing a questionnaire without performing color scanning, it is not necessary to use the color parameter.

In FIG. 8A, as the color parameter, a color C1 is used for the cloud service A, and a color C2 is used for the cloud service C. The color parameter is not used for the cloud service B. As the resolution parameter, a resolution R1 is used for the cloud service A, and a resolution R2 is used for the cloud service B. The resolution parameter is not used for the cloud service C. As the document size parameter, a document size S1 is used for the cloud service A, a document size S2 is used for the cloud service B, and a document size S3 is used for the cloud service C.

FIGS. 8B through 8D illustrate expressions for calculating the number of virtual machines 20 concerning each of the parameters shown in FIG. 8A. FIG. 8B illustrates expressions for calculating the number of virtual machines 20 concerning the color parameter. In FIG. 8B, the number of virtual machines 20 is calculated according to whether or not color scanning is performed. FIG. 8B shows that the processing load imposed by performing color scanning using the color C1 is higher than that using the color C2. FIG. 8B shows that, concerning the color C1, the number of virtual machines 20 required when color scanning is performed is one, while the number of virtual machines 20 required when black and white scanning is performed is 0.2, and that, concerning the color C2, the number of virtual machines 20 required when color scanning is performed is 0.4, while the number of virtual machines 20 required when black and white scanning is performed is 0.2. For example, concerning the cloud service A using the color C1, the number of virtual machines 20 required when color scanning is performed is calculated to be one.

FIG. 8C illustrates expressions for calculating the number of virtual machines 20 concerning the resolution parameter. In FIG. 8C, the number of virtual machines 20 required per 100 dots per inch (dpi) is defined. FIG. 8C shows that, concerning the resolution R1, the number of virtual machines 20 required per 100 dpi is 0.5, and that, concerning the resolution R2, the number of virtual machines 20 required per 100 dpi is 0.2. For example, concerning the cloud service A using the resolution R1, the number of virtual machines 20 required when the resolution is set to be 400 dpi is calculated to be two.

FIG. 8D illustrates expressions for calculating the number of virtual machines 20 concerning the document size parameter. In FIG. 8D, the number of virtual machines 20 is calculated according to the size of a document. FIG. 8D shows that, concerning the document size S1, the number of virtual machines 20 required when the size of a document is A3 is 0.4, while the number of virtual machines 20 required when the size of a document is A4 is 0.2, and that, concerning the document size S2, the number of virtual machines 20 required when the size of a document is A3 is 0.2, while the number of virtual machines 20 required when the size of a document is A4 is 0.2. FIG. 8D also shows that, concerning the document size S3, the number of virtual machines 20 required when the size of a document is A3 is 0.6, while the number of virtual machines 20 required when the size of a document is A4 is 0.3. For example, concerning the cloud service A using the document size S1, the number of virtual machines 20 required when the size of a document is set to be A3 is calculated to be 0.4.

In FIGS. 8A through 8D, the estimated number of virtual machines 20 required when a certain cloud service is utilized is calculated by adding the numbers of virtual machines 20 calculated for the individual parameters. For example, the estimated number of virtual machines 20 required when the cloud service A is utilized is calculated by adding the numbers of virtual machines 20 calculated for the color C1, the resolution R1, and the document size S1. The decimal places of the estimated number of virtual machines 20 calculated in this manner are rounded up to an integer. As a more specific example, when the cloud service A is utilized, if the user sets settings such that color scanning is performed, the resolution is 400 dpi, and the size of a document is A3, the estimated number of virtual machines 20 is calculated to be 3.4 (four virtual machines 20 by rounding up the decimal place). In another example, the estimated number of virtual machines 20 required when the cloud service B is utilized is calculated by adding the numbers of virtual machines 20 for the resolution R2 and the document size S2. As a more specific example, when the cloud service B is utilized, if the user sets settings such that the resolution is 300 dpi and the size of a document is A4, the estimated number of virtual machines 20 is calculated to be 0.8 (one virtual machine 20 by rounding up the decimal place).

Referring back to FIG. 5A, in step SA7, the controller 101 calculates a difference between the estimated number of virtual machines 20 calculated in step SA6 and the requested number of virtual machines 20 (hereinafter such a difference will be referred to as a "variable N1"). More specifically, the controller 101 reads the estimated number of virtual machines 20 and the requested number of virtual machines 20 from the RAM and calculates the variable N1 therebetween. For example, if the estimated number of virtual machines 20 is four and the requested number of virtual machines 20 is one, the variable N1 is calculated to be three. If both of the estimated number of virtual machines 20 and the requested number of virtual machines 20 is one, the variable N1 is calculated to be 0. The controller 101 stores the calculated variable N1 in the RAM. In step SA8, the controller 101 sends a get request to the service providing apparatus 2 again. More specifically, the controller 101 reads the variable N1 from the RAM and sends a get request to get the same number of virtual machines 20 as the variable N1 to the service providing apparatus 2. If the variable N1 is 0, the controller 101 does not send a get request. In step SA9, the controller 101 updates the requested number of virtual machines 20 stored in the RAM. More specifically, the controller 101 updates the requested number of virtual machines 20 to the estimated number of virtual machines 20 calculated in step SA6.

In step SA10, the controller 101 receives the input of an instruction to start reading an image (hereinafter referred to as a "reading start instruction"). A reading start instruction is input as a result of a user operating the operation unit 103. In step SA11, the controller 101 starts reading an image. More specifically, plural documents are stacked on a document tray in advance, and the controller 101 sequentially reads images from these documents. The controller 101 stores image data indicating the read images in the RAM. In step SA12 in FIG. 5B, the controller 101 determines whether or not an estimation expression is stored for estimating the amount of image data obtained from all documents (hereinafter referred to as a "total amount of image data") stacked on a document tray which forms an automatic document feeding mechanism (not shown) of the image forming apparatus 1. More specifically, the controller 101 determines, on the basis of data indicating estimation expressions (hereinafter referred to as "estimation expression data") stored in the storage unit 102, whether or not an estimation expression for estimating the total amount of image data is stored for a cloud service to be requested. If it is determined in step SA12 that an estimation expression is stored, the controller 101 proceeds to step SA13. If it is determined in step SA12 that no estimation expression is stored, the controller 101 proceeds to step SA14. In step SA13, the controller 101 estimates the total amount of image data by utilizing the estimation expression. The controller 101 then stores the estimated total amount of image data in the RAM.

FIG. 9 illustrates an example of estimation expression data. The estimation expression data indicates, for each cloud service, whether or not an estimation expression is stored, and if any, indicates such an estimation expression. In the example of the estimation expression data shown in FIG. 9, an estimation expression is stored for each of the cloud services A and B, while an estimation expression is not stored for the cloud service C. In the example shown in FIG. 9, the cloud service A is a cloud service that performs information processing for detecting a difference in image data between documents which have not been modified and documents which have been modified. Concerning the cloud service A, the total amount of image data is estimated by doubling the amount of image data indicating images read from the documents which have not been modified. In this example, the images of the documents which have not been modified are read prior to the images of the documents which have been modified. When the estimation expression is utilized for the cloud service A, the controller 101 detects a timing at which a document which is being read by the image reader 105 is switched from a document which has not been modified to a document which has been modified, and then obtains the amount of image data indicating the images read from the documents which have not been modified. In one example, the above-described timing may be detected as a time at which the documents which have been modified are placed on a document tray and a button of a touch panel is pressed after the documents which have not been modified have been input. In another example, the above-described timing may be detected as a time at which the degree of similarity between an image which has already been read and an image which has just been read exceeds a predetermined threshold. In a more specific example in which the total amount of image data is estimated by utilizing the estimation expression for the cloud service A, if the amount of image data indicating the images read from documents which have not been modified is two megabytes (MB), the total amount of image data is estimated to be 4 MB.

In the example shown in FIG. 9, the cloud service B is a cloud service performed on the basis of a precondition that the size of plural documents is the same (for example, a cloud service that performs information processing for analyzing and summarizing a questionnaire). Concerning the cloud service B, the total amount of image data is estimated by multiplying the amount of image data indicating an image read from the first document by the number of documents placed on the document tray which forms the automatic document feeding mechanism (not shown) of the image forming apparatus 1. The image reader 105 has a sensor for detecting the number of documents placed on the document tray. Accordingly, the controller 101 has obtained the number of documents from this sensor before starting to read images. In a more specific example in which the total amount of image data is estimated by utilizing the estimation expression for the cloud service B, if the amount of image data indicating an image read from the first document is 0.05 MB and if the number of documents placed on the document tray is 30, the total amount of image data is estimated to be 1.5 MB.

Referring to FIG. 5B, in step SA14, while images are being read from the documents, the controller 101 stores the accumulated amount of image data indicating images which have already been read in the RAM. If step SA14 is executed, steps SA15 through SA17 are executed every time the accumulated amount of image data is increased by a predetermined amount.

In step SA15, the controller 101 calculates a number (hereinafter referred to as a "variable N2") corresponding to a difference or a proportion between the total amount of image data stored in the RAM in step SA13 or the accumulated amount of image data stored in the RAM in step SA14 and a predetermined amount of image data (hereinafter referred to as an "image data amount D1"). The image data amount D1 is stored in the storage unit 102 in advance according to the type of cloud service. The image data amount D1 may be updated according to the history of the amount of image data obtained in the past use of a cloud service. The controller 101 stores the calculated variable N2 in the RAM.

In step SA16, the controller 101 sends a get request or a request to release virtual machines 20 (hereinafter referred to as a "release request") to the service providing apparatus 2. More specifically, the controller 101 sends a get request or a release request according to a protocol to which a cloud service conforms. A release request includes information indicating the number of virtual machines 20 that the user would like the service providing apparatus 2 to release. If the variable N2 stored in the RAM is positive, the controller 101 sends a get request to get the same number of virtual machines 20 as the variable N2 to the service providing apparatus 2. If the variable N2 stored in the RAM is negative, the controller 101 sends a release request to release the same number of virtual machines 20 as the variable N2 (in this case, the absolute value of the variable N2) to the service providing apparatus 2. If the variable N2 is 0, the controller 101 sends neither of a get request nor a release request. If step SA14 is executed, the controller 101 does not send a release request even if the variable N2 is negative. That is, if step SA14 is executed, the controller 101 sends a get request to get the same number of virtual machines 20 as the variable N2 to the service providing apparatus 2 when the variable N2 becomes positive.

FIG. 10 illustrates an example of a release request. The release request shown in FIG. 10 is a release request written in the XML format. The release request includes, as shown in FIG. 10, information indicating that this request is a request to release a virtual machine 20 (<record name="releaseRequest"> in the third line) and indicating the number of virtual machines 20 to be released (<string name="value">1</string> in the sixth line). In the example of the release request shown in FIG. 10, the releasing of one virtual machine 20 is requested.

Referring back to FIG. 5B, in step SA17, the controller 101 updates the requested number of virtual machines 20 stored in the RAM. More specifically, the controller 101 stores a value obtained by adding the variable N2 to the requested number of virtual machines 20 stored in the RAM as a new requested number of virtual machines 20. Step SA17 is executed if a get request or a release request is sent in step SA16. In step SA18, the controller 101 finishes reading images from all documents placed on the document tray. In step SA19, the controller 101 sends the various parameters and image data stored in the RAM to the service providing apparatus 2. The service providing apparatus 2 receives the parameters and image data from the image forming apparatus 1, and then starts to perform processing concerning a cloud service.

By performing the above-described processing, before image data is sent from the image forming apparatus 1 to the service providing apparatus 2, a get request or a release request is sent to the service providing apparatus 2. A get request or a release request is sent at plural time points corresponding to different steps of processing performed by the image forming apparatus 1 (that is, a time point at which the input of a service start instruction has been received, a time point at which settings for parameters have been set, and at a time point at which the amount of image data has been estimated (or the amount of image data has increased by a predetermined amount). Accordingly, the accuracy of the required number of virtual machines 20 indicated in a get request or a release request to be sent to the service providing apparatus 2 is increased as the time approaches the start of processing performed in a cloud service. Accordingly, virtual machines 20 that are not necessary for processing image data are not got, thereby reducing the cost incurred for a user. Additionally, a less time is required to get a virtual machine 20 than a case in which the service providing apparatus 2 starts to get a virtual machine 20 after obtaining image data from the image forming apparatus 1.

Figures 11, 12:
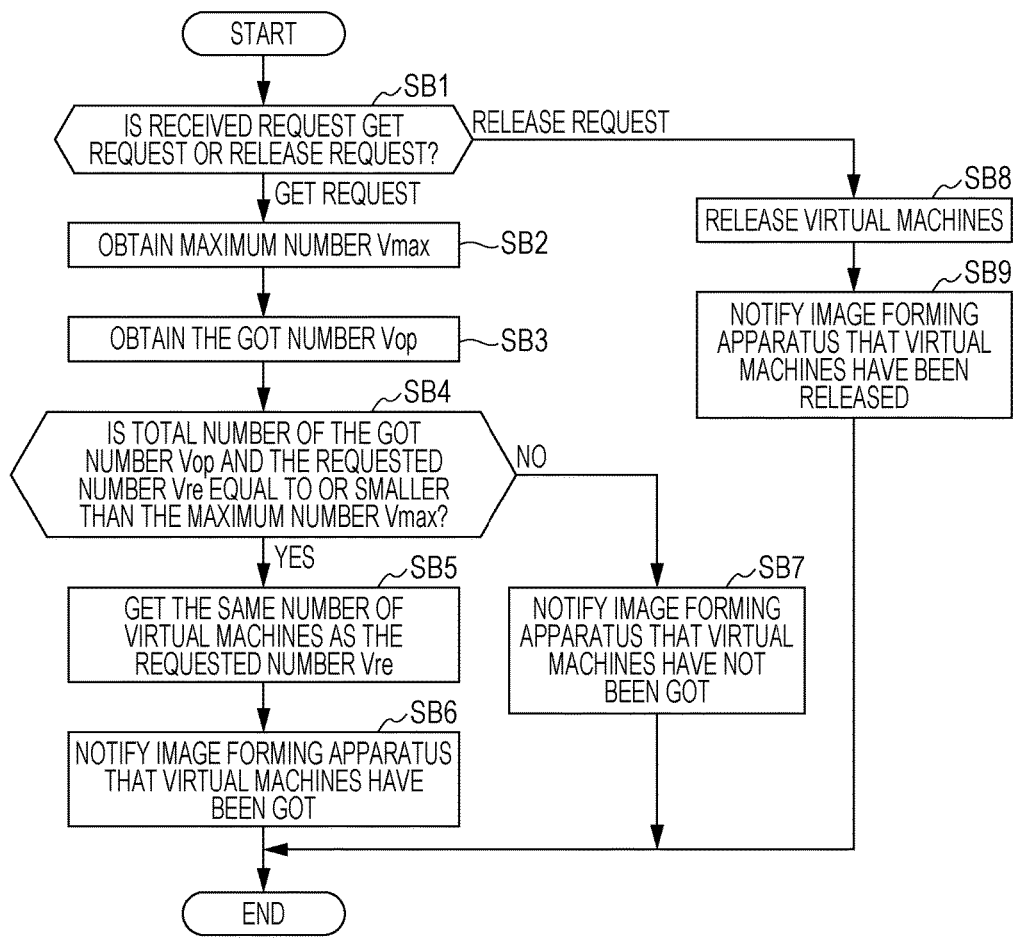
FIG. 11 is a flowchart illustrating processing performed by the service providing apparatus.
FIG. 12 illustrates an example of maximum-number-of-machines data.

FIG. 11 is a flowchart illustrating processing performed by the service providing apparatus 2. The following processing is started when a get request or a release request is sent to the service providing apparatus 2. In step SB1, the controller 201 determines whether a request sent from the image forming apparatus 1 is a get request or a release request. If it is determined in step SB1 that the request is a get request, the controller 201 proceeds to step SB2. If it is determined in step SB1 that the request is a release request, the controller 201 proceeds to step SB8.

In step SB2, the controller 201 obtains the maximum number of virtual machines 20 (hereinafter referred to as a "maximum number Vmax"). More specifically, the controller 201 obtains the maximum number Vmax on the basis of data indicating the maximum number Vmax of virtual machines 20 (hereinafter referred to as "maximum-number-of-machines data") stored in the storage unit 202. The controller 201 stores the obtained maximum number Vmax in the RAM.

FIG. 12 illustrates an example of the maximum-number-of-machines data according to the cloud service used by clients. In FIG. 12, providers A, D, and E provide cloud services A, D, and E, respectively. In this example, the service providing apparatus 2 provides the cloud services A, D, and E. In the maximum-number-of-machines data shown in FIG. 12, the maximum numbers Vmax of virtual machines 20 that may be used by the clients utilizing the cloud services A, D, and E are 10, 5, and 2, respectively. If the maximum-number-of-machines data shown in FIG. 12 is utilized, the controller 201 obtains information indicating the maximum number Vmax of virtual machines 20 concerning a provider that provides a cloud service for which a get request has been sent. The cloud service for which a get request has been sent is specified by the URL which is used when the service providing apparatus 2 communicates with the image forming apparatus 1. The maximum number Vmax of virtual machines 20 that may be used by a client utilizing a cloud service may differ depending on the client. In this case, the maximum-number-of-machines data indicates the maximum number Vmax for each client. Then, the controller 201 specifies a client from, for example, the IP address of the image forming apparatus 1, which is the sender of the get request, and obtains information indicating the maximum number Vmax applied to this client.

Referring back to FIG. 11, in step SB3, the controller 201 obtains information indicating the number of got virtual machines 20 (hereinafter referred to as a "got number Vop") concerning a provider that provides a cloud service for which the get request has been sent. If cloud platform software (software for managing a platform, such as the virtual machines 20 and storages of a server device), such as OpenStack, is installed in the service providing apparatus 2, the controller 201 obtains information concerning the got number Vop of virtual machines 20 by using a command for obtaining a list of got virtual machines 20.

Figures 13, 14, 15, 16:
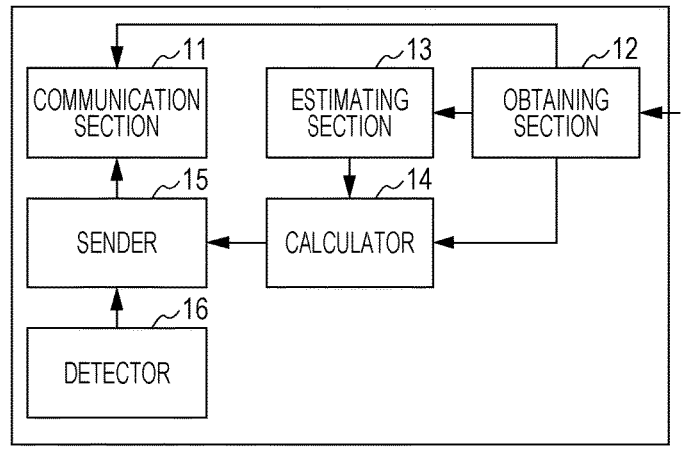
FIG. 13 illustrates an example of a command for obtaining a got number Vop of virtual machines.
FIG. 14 illustrates an example of a response from the service providing apparatus.
FIG. 15 is a block diagram illustrating an example of the functional configuration of the image forming apparatus according to a second modified example.
FIG. 16 illustrates an example of number-of-machines calculating data Di.

FIG. 13 illustrates an example of a command for obtaining the got number Vop of virtual machines 20 by the controller 201. In FIG. 13, "nova list" is used as a command for obtaining the got number Vop of virtual machines 20. In FIG. 13, a list of virtual machines 20 identified by an ID "266ec61b-79c7-41cb-ac74-5bed831c5c28" and an ID "223ec6db-fdaf-fdaa-ggrg-fdjkaaf67d8a" is shown, and the got number Vop of virtual machines 20 is two.

Referring back to FIG. 11, in step SB4, the controller 201 determines whether the total number of the got number Vop and the number of virtual machines 20 indicated in the get request (hereinafter referred to as a "requested number Vre") is equal to or smaller than the maximum number Vmax. If the result of step SB4 is YES, the controller proceeds to step SB5. If the result of step SB4 is NO, that is, if the total number of the got number Vop and the requested number Vre is greater than the maximum number Vmax, the controller 201 proceeds to step SB7.

In step SB5, the controller 201 gets the same number of virtual machines 20 as the requested number Vre. In step SB6, the controller 201 notifies, as a response to the get request, the image forming apparatus 1 that virtual machines 20 have been got. In step SB7, the controller 201 notifies, as a response to the get request, the image forming apparatus 1 that virtual machines 20 have not been got.

FIG. 14 illustrates an example of a response from the service providing apparatus 2 to a request from the image forming apparatus 1. In this example, the response from the service providing apparatus 2 is written in the XML format, and shows that virtual machines 20 have not been got.

Referring back to FIG. 11, in step SB8, the controller 201 releases the same number of virtual machines 20 as the number indicated by the release request. In step SB9, the controller 201 notifies, as a response to the release request, the image forming apparatus 1 that virtual machines 20 have been released.

By performing the above-described processing, in the service providing apparatus 2, virtual machines 20 are got or released before processing for a cloud service is started. Accordingly, a less time is required from when the image forming apparatus 1 sends image data to the service providing apparatus 2 until when the image forming apparatus 1 receives the image data subjected to information processing performed in a cloud service from the service providing apparatus 2.

The present invention is not restricted to the above-described embodiment, and various modifications may be carried out. Some modified examples will be discussed below. Among the following modified examples, two or more of the modified examples may be combined.

(1) First Modified Example

A timing at which the estimated number of virtual machines 20 is calculated is not restricted to the timings discussed in the exemplary embodiment. The estimated number of virtual machines 20 may be calculated after image data has been read from all documents stacked on a document tray and the total amount of image data has been fixed. As a specific example, if step SA14 is executed, the estimated number of virtual machines 20 may be calculated in accordance with the fixed total amount of image data. In this case, a difference between the estimated number of virtual machines 20 calculated according to the fixed total amount of image data and the requested number of virtual machines 20 (hereinafter such a difference will be referred to as a "variable N3") may be calculated by the controller 101, and a get request or a release request to get or release the same number of virtual machines 20 as the variable N3 may be sent to the service providing apparatus 2. If the variable N3 is positive, the controller 101 sends a get request to get the same number of virtual machines 20 as the variable N3 to the service providing apparatus 2. If the variable N3 is negative, the controller 101 sends a release request to release the same number of virtual machines 20 as the variable N3 (in this case, the absolute value of the variable N3) to the service providing apparatus 2.

(2) Second Modified Example

A timing at which the image forming apparatus 1 sends a release request to the service providing apparatus 2 is not restricted to the timing discussed in the exemplary embodiment. In one example, upon the occurrence of any event that may hamper the start of processing in a cloud service, such as a paper jam while images are being read from documents or a failure of the image reader 105, the image forming apparatus 1 may send a release request. In this case, the controller 101 detects the occurrence of such an event upon receiving a signal indicating an error from a corresponding element of the image forming apparatus 1, such as the automatic document feeding mechanism or the image reader 105. Alternatively, the controller 101 may detect the occurrence of such an event by utilizing SNMP (Simple Network Management Protocol) Notification. In another example, if an operation for starting the use of a cloud service has stopped, the image forming apparatus 1 may send a release request. In this case, the controller 101 detects the occurrence of such an event when a user inputs an instruction to cancel the use of a cloud service or logs out of the service on a screen for receiving settings of various parameters, or when the user has not performed any operation on this screen for a predetermined time.

FIG. 15 is a block diagram illustrating an example of the functional configuration of the image forming apparatus 1 according to a second modified example. The image forming apparatus 1 includes, as shown in FIG. 15, a detector 16 in addition to the elements shown in FIG. 2. In this modified example, the detector 16 detects the occurrence of an event that may hamper the start of processing in a cloud service after a get request has been sent to the service providing apparatus 2. Upon detecting the occurrence of such an event by the detector 16, the sender 15 sends a release request to the service providing apparatus 2. In the second modified example, the controller 101 that is executing a program is an example of the detector 16. The detector 16 may detect that an operation for starting the use of a cloud service has stopped after a get request has been sent to the service providing apparatus 2.

(3) Third Modified Example

Upon receiving information indicating whether or not virtual machines 20 have been got as a response to a get request, if the information indicates that virtual machines 20 have not been got, the image forming apparatus 1 may send a get request to the service providing apparatus 2 again. Then, upon receiving information indicating that virtual machines 20 have been got as a response to a get request, the image forming apparatus 1 sends various parameters and image data to the service providing apparatus 2. The image forming apparatus 1 may repeatedly send a get request to the service providing apparatus 2 until information indicating that virtual machines 20 have been got is received.

(4) Fourth Modified Example

When notifying, as a response to a get request, the image forming apparatus 1 that virtual machines 20 have not been got, the service providing apparatus 2 may inform the image forming apparatus 1 of the number of available virtual machines 20 (that is, the number of virtual machines 20 which have not yet been got and which does not exceed the maximum number Vmax). The number of available virtual machines 20 is obtained by calculating the difference between the maximum number Vmax and the got number Vop. In this case, if the number of available virtual machines 20 is equal to or greater than the minimum number of virtual machines 20 required for performing a cloud service which the image forming apparatus 1 has requested, the image forming apparatus 1 may send a get request to get these available virtual machines 20 to the service providing apparatus 2.

(5) Fifth Modified Example

Services provided by the service providing apparatus 2 are not restricted to cloud services, but may be on-premises server services or print services.

(6) Sixth Modified Example

In step SA13, the estimated number of virtual machines 20 may be calculated in accordance with the estimated total amount of image data, or in step SA14, the estimated number of virtual machines 20 may be calculated in accordance with the accumulated amount of image data stored in the RAM. In this case, in step SA15, the controller 101 may calculate, as the variable N2, a difference between the estimated number of virtual machines 20 calculated in step SA13 or SA14 and the requested number of virtual machines 20. In step SA13 of the sixth modified example, the controller 101 may calculate the estimated number of virtual machines 20 on the basis of data, which is stored in the storage unit 102, for calculating the estimated number of virtual machines 20 in accordance with the total amount of image data (hereinafter such data will be referred to as a "number-of-machines calculating data Di". In step SA14 of the sixth modified example, the controller 101 may calculate the estimated number of virtual machines 20 at a predetermined rate every time the accumulated amount of image data is increased by a predetermined amount (for example, 1 MB) (for example, at a rate of 0.7 virtual machines 20 per 1 MB of image data). The decimal places of the estimated number of virtual machines 20 calculated in this manner are rounded up to an integer. The controller 101 updates the estimated number stored in the RAM to a newly calculated estimated number.

FIG. 16 illustrates an example of the number-of-machines calculating data Di. The number-of-machines calculating data Di indicates expressions for calculating the estimated number of virtual machines 20 according to the cloud service. In this case, for each cloud service, an estimation expression for estimating the total amount of image data is stored. In the example shown in FIG. 16, concerning the cloud service A, the estimated number of virtual machines 20 is calculated at a rate of 0.5 machines per 1 MB of image data. For example, concerning the cloud service A, if the total amount of image data is 4 MB, the estimated number of virtual machines 20 is calculated to be two. Concerning the cloud service B, the estimated number of virtual machines 20 is calculated at a rate of one machine per 1 MB of image data. For example, concerning the cloud service B, if the total amount of image data is 1.5 MB, the estimated number of virtual machines 20 is calculated to be 1.5 (two virtual machines 20 by rounding up the decimal place).

(7) Other Modified Examples

The number of virtual machines 20 requested in a get request sent in step SA3 may differ depending on the type of cloud service or the service providing apparatus 2. For example, a request to get one virtual machine 20 may be sent to a certain service providing apparatus 2, and a request to get plural virtual machines 20 may be sent to another service providing apparatus 2.

Various parameters for which settings are set in step SA4 are not restricted to those discussed in the exemplary embodiment.

Expressions for calculating the number of virtual machines 20 in step SA6 are not restricted to those discussed in the exemplary embodiment. The decimal places of the estimated number of virtual machines 20 calculated in step SA6 do not have to be rounded up to an integer. Instead, the decimal places may be rounded off to an integer.

A request sent to the service providing apparatus 2 in step SA8 is not restricted to a get request. If the variable N1 stored in the RAM is negative, a release request to release the same number of virtual machines 20 as the variable N1 (in this case, the absolute value of the variable N1) may be sent to the service providing apparatus 2.

An estimation expression for estimating the total amount of image data in step SA13 is not restricted to that discussed in the exemplary embodiment. Any estimation expression may be used as long as the total amount of image data can be estimated from such an estimation expression.

Execution of step SA13 is not always necessary. In this case, step SA12 is omitted, and step SA14 is executed for a cloud service to be utilized. Alternatively, execution of step SA14 is not always necessary. In this case, step SA12 is omitted, and step SA13 is executed for a cloud service to be utilized.

A timing at which a get request or a release request is sent is not restricted to timings discussed in the exemplary embodiment. A get request or a release request may be sent at any timing of processing that the image forming apparatus 1 is performing.

The information processing apparatus is not restricted to the image forming apparatus 1. The information processing apparatus may be another type of apparatus which serves as a client apparatus (for example, a personal computer).

Image data to be processed in a cloud service is not restricted to image data indicating images read from plural documents. Image data indicating an image read from a single document may be subjected to processing in a cloud service. Additionally, data to be processed in a cloud service is not restricted to image data.

In the above-described exemplary embodiment, the image forming apparatus 1 obtains image data by reading documents by using the document reader 105. However, the image forming apparatus 1 may obtain image data from another information processing apparatus via network, or from an attachable/detachable recording medium, such as a USB memory.

Computer resources are not restricted to virtual machines 20. For example, if the service providing apparatus 2 is constituted by plural computers, physical computers may be used as computer resources. In this case, in a get request, the getting of a predetermined number of computers is requested. In a release request, releasing of a predetermined number of computers is requested. Computer resources got or released by the service providing apparatus 2 are not restricted to virtual machines or physical machines, but may be a memory, a hard disk drive (HDD), or a CPU. In this case, getting or releasing of the capacity of a memory or an HDD, or the number of cores of the CPU or the time of use of the CPU is requested.

The hardware configurations of the image forming apparatus 1 and the service providing apparatus 2 used in the image processing system are not restricted to those shown in FIGS. 3 and 4, respectively. The hardware configurations of the image forming apparatus 1 and the service providing apparatus 2 may be any configuration as long as the steps of processing shown in FIGS. 5 and 11 are executable by the image forming apparatus 1 and the service providing apparatus 2, respectively.

In an exemplary embodiment, a program executed by the image forming apparatus 1 and the service providing apparatus 2 may be provided while being stored in a computer readable recording medium, such as a magnetic recording medium (such as magnetic tape or a magnetic disk (for example, an HDD or a flexible disk (FD)), an optical recording medium (for example, an optical disk (compact disk (CD) or a digital versatile disk (DVD)), a magneto-optical recording medium, or a semiconductor memory (for example, a flash ROM). Alternatively, this program may be downloaded via a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one hardware processor configured to implement:
a communication section configured to communicate with a processing providing apparatus which utilizes a different amount of resource in accordance with a load of processing to be performed on data;
a calculator configured to calculate an amount of resource to be utilized for performing processing on the data by the processing providing apparatus, at a plurality of time points corresponding to different steps of processing performed by the information processing apparatus before sending the data and a request for processing the data to the processing providing apparatus; and
a sender configured to send, at a plurality of time points corresponding to the different steps, a request to get or release the resource based on the amount of resource calculated by the calculator to the processing providing apparatus via the communication section.

2. The information processing apparatus according to claim 1, wherein the sender is further configured to send a request to get or release the resource to the processing providing apparatus in response to every time the amount of resource is calculated.

3. The information processing apparatus according to claim 2, wherein the calculator is further configured, in response to receiving an instruction to perform processing on the data, to calculate the amount of resource in accordance with a type of processing to be performed on the data.

4. The information processing apparatus according to claim 2, wherein the calculator is further configured, in response to receiving a setting of a parameter used for performing processing on the data, to calculate the amount of resource in accordance with the parameter.

5. The information processing apparatus according to claim 2, wherein the at least one hardware processor is further configured to implement:
an obtaining section configured to obtain data to be subjected to the processing; and
an estimating section configured to estimate an amount of data to be obtained by the obtaining section before the obtaining section finishes obtaining the data,
wherein the calculator is further configured, in response to the estimating section estimating the amount of data, to calculate the amount of resource in accordance with the estimated amount of data.

6. The information processing apparatus according to claim 2, wherein the at least one hardware processor is further configured to implement:
an obtaining section configured to obtain data to be subjected to the processing,
wherein the calculator is further configured, in response to every time an amount of data which is being obtained by the obtaining section exceeds a predetermined value, calculate the amount of resource in accordance with the predetermined value.

7. The information processing apparatus according to claim 2, wherein the at least one hardware processor is further configured to implement:
an obtaining section configured to obtain data to be subjected to the processing,
wherein the calculator is further configured, in response to the obtaining section obtaining the data, to calculate the amount of resource in accordance with an amount of data obtained by the obtaining section.

8. The information processing apparatus according to claim 1, wherein the at least one hardware processor is further configured to implement:
a detector configured to detect an occurrence of an event which hampers processing performed on the data from being started after a request to get the resource has been sent by the sender,
wherein, upon detecting an occurrence of an event which hampers processing performed on the data from being started by the detector, the sender is further configured, in response to the detector detecting the occurrence of the event which hampers processing performed on the data from being stated by the detector, sends a request to release the resource to the processing providing apparatus.

9. The information processing apparatus according to claim 1, wherein the at least one hardware processor is further configured to implement:
a detector configured to detect that an operation for starting to perform processing on the data has stopped after a request to get the resource has been sent by the sender,
wherein the sender is further configured, in response to the detector detecting that the operation for starting to perform processing on the data has stopped, sends a request to release the resource to the processing providing apparatus.

10. The information processing apparatus according to claim 1, wherein:
the communication section is further configured to obtain, as a response to a request to get the resource, information indicating whether or not the resource has been gotten from the processing providing apparatus; and
if the information obtained by the communication section indicates that the resource has not been got, the sender is further configured, if the information obtained by the communication section indicates that the resource has not been gotten, to send a request to get the resource to the processing providing apparatus again.

11. The information processing apparatus according to claim 1, wherein:
the communication section is further configured to obtain, as a response to a request to get the resource, information indicating an available amount of resource if the resource has not been gotten from the processing providing apparatus; and
the sender is further configured, if the available amount of resource indicated by the information obtained by the communication section is equal to or greater than a minimum amount of resource to be utilized for performing processing on the data, to send a request to get the available amount of resource indicated by the information to the processing providing apparatus.

12. The information processing apparatus according to claim 1, wherein the calculator is configured to calculate the amount of resource to be utilized according to a number of pages present in document tray multiplied by a first amount of image data scanned from a first page, of the pages, after the first page has been moved from the document tray and scanned by the information processing apparatus.

13. The information processing apparatus according to claim 1, wherein the calculator is further configured to update the amount of resource to be utilized according to a second amount of image data scanned from a second page, of the pages, after the second page has been moved from the document tray and scanned by the information processing apparatus.

14. The information processing apparatus according to claim 1, wherein the first amount of image data and the second amount of image data are different numbers of bytes representing respective ones of the first page and the second page.

15. The information processing apparatus according to claim 1, wherein the communication section comprises a first circuitry;
the calculator comprises a second circuitry; and
the sender comprises a third circuitry.

16. The information processing apparatus according to claim 1, wherein the at least one hardware processor is further configured to implement:
updating the request to get or release the resource and any of a plurality of other resources based on an updated amount of resource calculated by the calculator, and
controlling processing on the data using at least one of the resource and the plurality of other resources.

17. An information processing system comprising:
an information processing apparatus; and
a processing providing apparatus configured to utilize a different amount of resource in accordance with a load of processing to be performed on data,
the information processing apparatus including at least one hardware processor configured to implement:
a first communication section configured to communicate with the processing providing apparatus,
a calculator that configured to calculate an amount of resource to be utilized for performing processing on the data by the processing providing apparatus, at a plurality of time points corresponding to different steps of processing performed by the information processing apparatus before the data and a request for processing the data is sent to the processing providing apparatus, and
a sender that configured to send, at a plurality of time points corresponding to the different steps, a request to get or release the resource based on the amount of resource calculated by the calculator to the processing providing apparatus via the communication section,
the processing providing apparatus including at least another hardware processor configured to implement:
a second communication section configured to communicate with the information processing apparatus, and
a manager configured to manage an amount of resource to be utilized and to get or release the resource in response to a request sent from the information processing apparatus before starting to perform processing on the data.

18. An information processing method comprising:
communicating with a processing providing apparatus which utilizes a different amount of resource in accordance with a load of processing to be performed on data;
calculating an amount of resource to be utilized for performing processing on the data by the processing providing apparatus, at a plurality of time points corresponding to different steps of processing performed by an information processing apparatus before sending the data and a request for processing the data to the processing providing apparatus; and
sending, at the plurality of time points corresponding to the different steps, a request to get or release the resource based on the calculated amount of resource to the processing providing apparatus.

19. A non-transitory computer readable medium storing a program causing a computer to execute a process, the process comprising:
communicating with a processing providing apparatus which utilizes a different amount of resource in accordance with a load of processing to be performed on data;
calculating an amount of resource to be utilized for performing processing on the data by the processing providing apparatus, at a plurality of time points corresponding to different steps of processing performed by an information processing apparatus before sending the data and a request for processing the data to the processing providing apparatus; and
sending, at the plurality of time points corresponding to the different steps, a request to get or release the resource based on the calculated amount of resource to the processing providing apparatus.

* * * * *